United States Patent
Hendel et al.

(10) Patent No.: US 7,734,837 B2
(45) Date of Patent: Jun. 8, 2010

(54) CONTINUOUS MEDIA PRIORITY AWARE STORAGE SCHEDULER

(75) Inventors: Matthew D. Hendel, Seattle, WA (US); Fnu Sidhartha, Bellevue, WA (US); Jane Win-Shih Liu, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 97 days.

(21) Appl. No.: 11/620,266

(22) Filed: Jan. 5, 2007

(65) Prior Publication Data

US 2007/0136496 A1 Jun. 14, 2007

Related U.S. Application Data

(63) Continuation of application No. 10/729,138, filed on Dec. 5, 2003, now Pat. No. 7,206,866.

(60) Provisional application No. 60/496,529, filed on Aug. 20, 2003.

(51) Int. Cl.
*G06F 3/00* (2006.01)
(52) U.S. Cl. .......................... 710/10; 710/8
(58) Field of Classification Search .................. None
See application file for complete search history.

(56) References Cited

U.S. PATENT DOCUMENTS

| | | | |
|---|---|---|---|
| 5,455,934 A * | 10/1995 | Holland et al. | 711/4 |
| 5,621,898 A * | 4/1997 | Wooten | 710/117 |
| 5,708,796 A | 1/1998 | Ozden et al. | |
| 5,761,692 A * | 6/1998 | Ozden et al. | 711/4 |
| 5,787,482 A | 7/1998 | Chen et al. | |
| 5,875,481 A | 2/1999 | Ashton et al. | |
| 5,991,825 A | 11/1999 | Ng | |
| 6,023,720 A | 2/2000 | Aref et al. | |
| 6,078,998 A * | 6/2000 | Kamel et al. | 711/151 |
| 6,079,028 A | 6/2000 | Ozden et al. | |
| 6,330,646 B1 | 12/2001 | Chen et al. | |
| 6,378,052 B1 | 4/2002 | Genduso et al. | |
| 6,442,648 B1 | 8/2002 | Genduso et al. | |
| 6,535,957 B1 | 3/2003 | Arimilli et al. | |
| 6,629,220 B1 | 9/2003 | Dyer | |

(Continued)

OTHER PUBLICATIONS

Love. "Interactive Kernel Performance: Kernel Performance in Desktop and Real-time Applications" Proceedings of the Linux Symposium, Jul. 23-26, 2003, Ottawa, Ontario, Canada.

(Continued)

*Primary Examiner*—Tariq Hafiz
*Assistant Examiner*—Aurangzeb Hassan
(74) *Attorney, Agent, or Firm*—Wolf, Greenfield & Sacks, P.C.

(57) ABSTRACT

The present invention relates to a system and methodology to facilitate I/O access to a computer storage medium in a predictable and efficient manner. A scheduling system is provided that mitigates the problem of providing differing levels of performance guarantees for disk I/O in view of varying levels of data access requirements. In one aspect, the scheduling system includes an algorithm or component that provides high performance I/O updates while maintaining high throughput to the disk in a bounded or determined manner. This is achieved by dynamically balancing considerations of I/O access time and latency with considerations of data scheduling requirements. Also, the system provides latency boundaries for multimedia applications as well as managing accesses for other applications.

20 Claims, 7 Drawing Sheets

U.S. PATENT DOCUMENTS 6,654,851 B1    11/2003  McKean
6,877,049 B1*   4/2005   Myers .................... 710/56
7,197,577 B2*   3/2007   Nellitheertha ............ 710/6

OTHER PUBLICATIONS

Nagar, et al. "Class-based Prioritized Resource Control in Linux" Proceedings of the Linux Symposium, Jul. 23-26, 2003, Ottawa, Ontario, Canada.

Worthington, et al. "Scheduling Algorithms for Modern Disk Drives" Proceedings of the ACM Sigmetrics, May 1994, pp. 241-251.

Iyer, et al. "Anticipatory Scheduling: A Disk Scheduling Framework to Overcome Deceptive Idleness in Synchronous I/O" Proceedings of the 18th Symposium on Operating Systems Principles, Oct. 2001, 14 pages.

Akyurek, et al. "Adaptive Block Rearrangement" (1995) ACM Transactions on Computer Systems, vol. 13 Issue 2, pp. 89-121.

* cited by examiner

CONTINUOUS MEDIA PRIORITY AWARE STORAGE SCHEDULER

REFERENCE TO RELATED APPLICATION

This application is a continuation of U.S. patent application Ser. No. 10/729,138 filed on Dec. 5, 2003, entitled "CONTINUOUS MEDIA PRIORITY AWARE STORAGE SCHEDULER" which claims the benefit of U.S. Provisional Patent Provisional Patent Application Ser. No. 60/496,529 which was filed Aug. 20, 2003, entitled "CONTINUOUS MEDIA PRIORITY AWARE STORAGE SCHEDULER".

TECHNICAL FIELD

The present invention relates generally to computer systems, and more particularly to a system and method that facilitates scheduling data requests to a disk in an efficient and bounded manner.

BACKGROUND OF THE INVENTION

To reduce the performance penalty incurred by seeking a drive head, operating system software (and drive firmware) traditionally reorder I/O packets to minimize seek time. Much research has been done to address long seek times while still maintaining fair access to the disk drive. Traditional disk scheduling algorithms generally reorder requests destined for a disk to maximize data throughput. One common algorithm implemented by many operating systems is the C-LOOK algorithm, often incorrectly referred to as the C-SCAN algorithm. The C-LOOK algorithm reorders any number of requests to achieve the highest throughput to a device that can be attained. However, in this type reordering, the C-LOOK algorithm can introduce large latencies between the time a request is begun and when the request is eventually completed.

As noted above, the most common algorithm that is implemented is the C-LOOK algorithm which orders requests in order that the disk head sweeps in one direction across the disk performing Input/Output operations (I/Os), then returns to the other side of the disk to perform additional I/Os. This is often referred to as logical block address ordering or LBA ordering. Unfortunately, traditional disk scheduling algorithms trade-off higher throughput to the disk, for longer access times (or latencies) over simple first-in-first-out (FIFO) queuing. This provides better throughput, but at the cost of potentially and dramatically higher latencies for I/O requests. For traditional operating systems, this trade-off is well worth the cost. For newer systems that need to support audio-visual streaming applications, in one example, merely trading latency for throughput is often not acceptable.

Many alternative disk-scheduling algorithms have been implemented. In particular, the first-come-first-serve (FCFS, also sometimes referred to as FIFO) algorithm and earliest-deadline-first (EDF) algorithms have been proposed respectively for scheduling in multimedia applications. The FCFS algorithm bounds the time to perform an I/O as a function of the current queue length and the EDF algorithm guarantees that requests with earlier deadlines will be executed before requests with later deadlines.

Unfortunately, both the FCFS and EDF algorithms suffer from poor I/O throughput. On special purpose and real-time operating systems, this poor utilization of the disk may not be a drawback, but on general purpose operating systems that also host multimedia applications, for example, significantly decreasing throughput to bound the latency to perform I/O requests is generally unacceptable.

SUMMARY OF THE INVENTION

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented later.

The present invention relates to systems and methods that facilitate dynamic scheduling of data requests to a storage media in an efficient, and timely manner. The data requests are processed as Input/Output (I/O) reads and writes to the storage media such as a disk drive or other type media. Scheduling is achieved in an architecture that reorders a fixed number of requests per scan of the disk drive, thus providing a fixed upper bound on the latency of the request wherein each scan of the disk drive is referred to as a round. Since the requests are reordered into an efficient pattern for the disk drive to execute, high throughput to the disk drive is also achieved. Thus, a disk scheduling system is provided that includes at least one scheduling component. The scheduling component employs a predetermined number of requests within a round to provide a particular latency guarantee for the requests while maintaining high throughput level in connection with disk updates.

In one aspect an admission controller is provided that categorizes I/O requests according to a determined category of I/O. For example, I/O associated with multi-media applications could be categorized as periodic I/O whereas other I/O could be characterized as aperiodic I/O. Aperiodic I/O is further characterized by priority where there are any fixed number of priorities. In one example implementation, the number of priorities may be limited to 32, however this can easily be changed to more or less values in other implementations.

Periodic I/O requests can be queued to the periodic I/O queue and maintained in earliest-deadline-first (EDF) order, if desired. Aperiodic I/O requests can be queued to a separate aperiodic I/O queue based upon the priority of the request; wherein the aperiodic queues can be maintained in FCFS order, for example. During each round of the algorithm, a fixed number of requests from the periodic queue and the aperiodic queues are removed and placed on a sweep queue. The sweep queue is maintained in C-LOOK order. The requests are removed from the sweep queue in C-LOOK order and scheduled to the disk. Since the elements are scheduled to the physical drive in C-LOOK order, high performance is maintained to the drive.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology to facilitate I/O access to a computer storage medium in a predictable and efficient manner. A scheduling system and method is provided that mitigates the problem of providing differing levels of performance guarantees for disk I/O in view of varying levels of data access requirements. In one aspect, the scheduling system includes an algorithm or component that promotes high performance I/O updates for more time-critical applications while maintaining high throughput to the disk in a bounded or determined manner. This is achieved by dynamically balancing considerations of I/O access time and latency (e.g., placing bounds on the limits of I/O access) with considerations of other data scheduling tasks (e.g., classifying levels of I/O access data tasks in terms of importance). Also, the system provides latency boundaries for multimedia applications (e.g., time-critical applications having periodic data such as audio and visual streams) as well as managing data access for other applications (e.g., lower priority I/O tasks associated with non-periodic data).

As used in this application, the terms "component," "scheduler," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Figure 1:
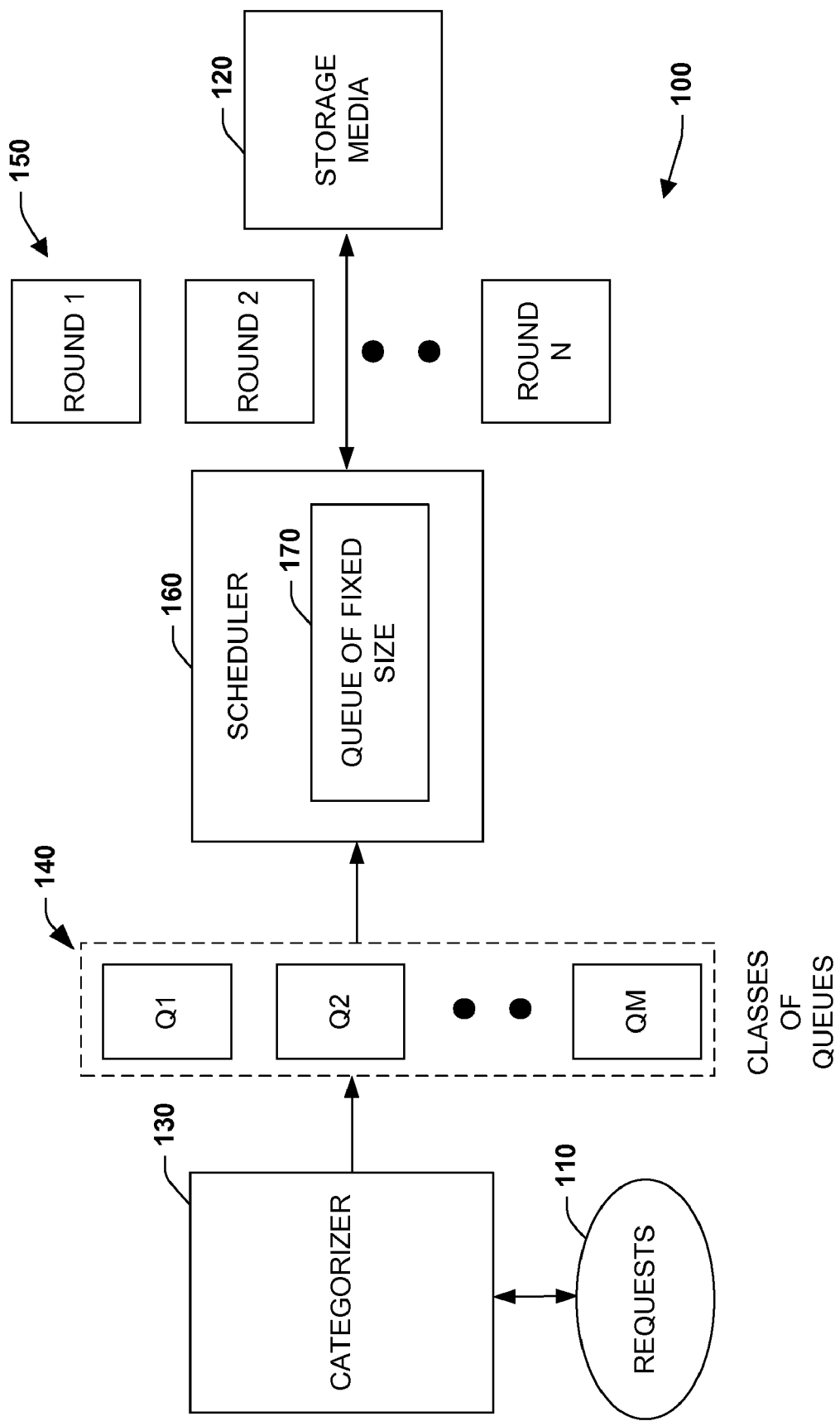
FIG. 1 is a schematic block diagram of a scheduling system in accordance with an aspect of the present invention.

Referring initially to FIG. 1, a scheduling system 100 is illustrated in accordance with an aspect of the present invention. One or more Input/Output (I/O) data requests 110 destined to/from a storage media 120 are processed by a categorizer 130 that automatically processes the requests into one or more classes of queues 140. Such queues 140 can include periodic queues for periodic I/O data such as multimedia streams and one or more queues for other type data such as aperiodic data. Periodic I/O streams are those that are generated at regular intervals such as for multimedia type applications. Other I/O streams are considered aperiodic I/O streams. Unlike periodic I/O, the arrival rate for aperiodic I/O can vary sharply over time. Aperiodic I/O can further be categorized into different I/O classes that also associated with the queues 140.

The categorizer 130 transfers requests into the queues 140 that are processed by a scheduler 160, having a fixed or predetermined size queue 170. The scheduler 160 transfers data to/from the queue 170 in order to read and/or write data to the storage media 120 in the form of one or more rounds of data 180 that are directed to the media in accordance with determined slots of time that bound the overall latency and throughput of the system. By transferring rounds 180 of data requests having predetermined size in terms of numbers of requests per round, the present invention dynamically balances the overall latency to access the storage media 120 in view of a desired data throughput level to/from the media.

As noted above, the data requests 110 are processed as I/O reads/writes to the storage media 120 which can include disk drives (e.g., hard disk, floppy disk) or other type media (e.g., CD, any type of memory that is scheduled to be accessed from a computer). Scheduling is generally provided in a multi-tiered architecture that bounds the latency of I/O requests by servicing a predetermined number, subset, or set of requests per round of requests 150 while maintaining desired throughput to the storage media 120. Also, a determined amount of I/O bandwidth can be dynamically reserved by the categorizer 130 and/or the scheduler 160 in order to allocate I/O scheduling for selected tasks. It is noted that the components illustrated in the system 100 can be isolated and communicate on local and/or remote computer systems, and/or can be combined in various forms to perform the functionality described herein (e.g., pre-categorizer and scheduler combined to form a scheduling function).

Figure 2:
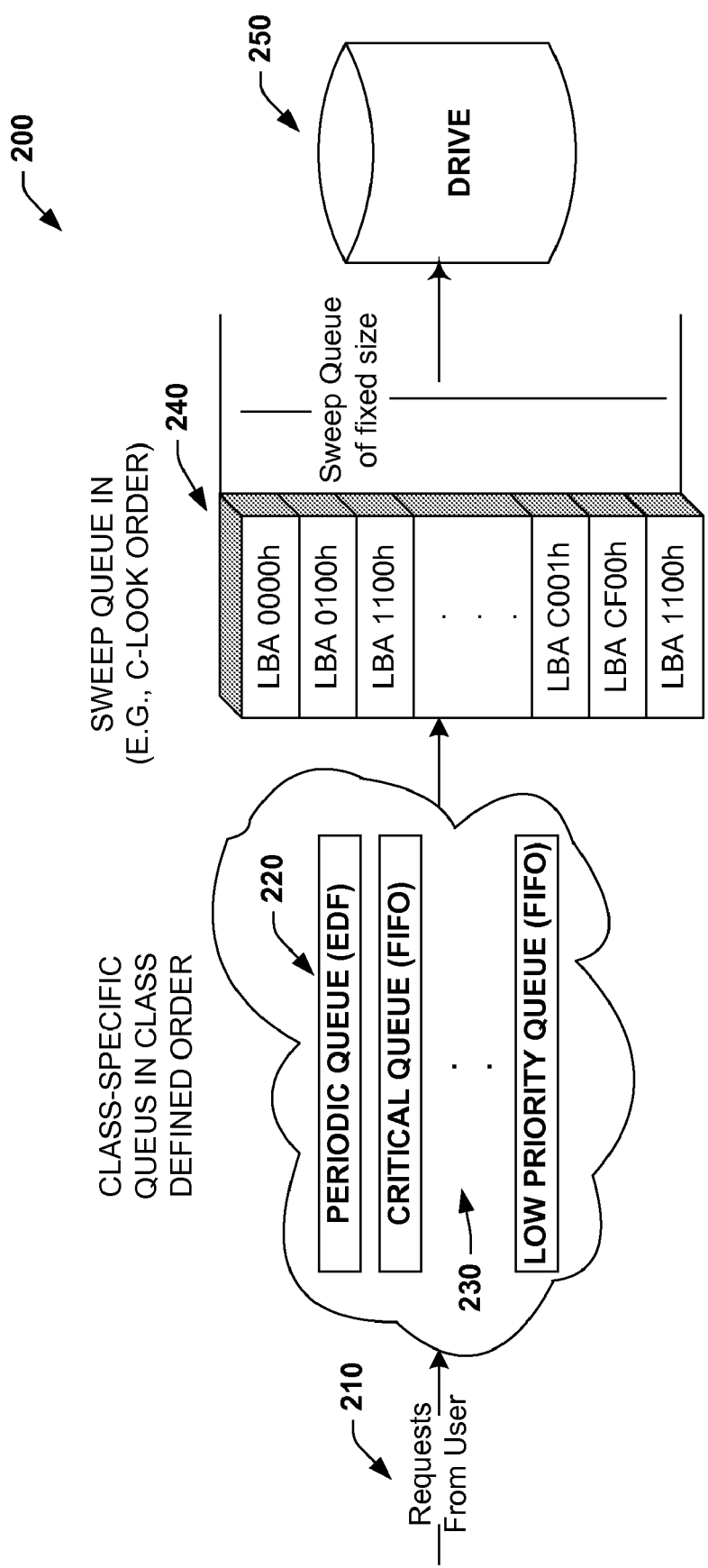
FIG. 2 is a diagram of a multi-tiered scheduling system in accordance with an aspect of the present invention.

Referring now to FIG. 2, a multi-tiered scheduling system 200 is illustrated in accordance with an aspect of the present invention. The system 200 can be described in terms of an algorithm, however, it is to be appreciated that the system may be implemented as a component, components, hardware, software, and/or combinations thereof. The system 200 processes a plurality of data requests 200 from a user or application. These requests 210 are processed into a periodic queue 220 (or queues) and one or more other queues 230. The requests from the queues 220 and 230 are then transferred into a sweep queue 240 having a fixed size before being written to or read from a disk 250. As noted above, the present invention bounds the latency of a set of requests while maintaining acceptable throughput. Thus, the system 200 can be provided as an algorithm that automatically and dynamically balances these considerations.

The system 200 generally distinguishes between two separate types of I/O streams. Periodic I/O streams are those that come at regular intervals for multimedia type applications. Thus, periodic I/O streams are opened with specific performance parameters that may be checked against system resources. If an attempt is made to open a periodic I/O stream that exceeds the capabilities of the system, the request can be aborted, if desired. An admission control mechanism (not shown) enforces that respective parameters of the periodic I/O are not exceeded. Other I/O streams are considered aperiodic I/O streams. Unlike periodic I/O, the arrival rate for aperiodic I/O can vary sharply over time.

Aperiodic I/O can further be categorized into different I/O priority classes. These different priorities represent different I/O needs of different components in the system such as a computer system. For example, when an operating system's memory manager runs out of paged memory, it is generally important that memory be freed as quickly as possible to ensure applications can continue to run. In this scenario, it is desirable that the memory manager's I/O requests not get blocked behind less important I/O requests from user applications. Conversely, background tasks often need to perform I/O to achieve their functions. If these background tasks generate large amounts of I/O, they can easily impact the performance of foreground tasks that generate less I/O. In general, the system 200 supports the following seven priority classes (more or less than seven can be employed): critical, high, interactive, normal, background, low, and idle. It is generally desirable that I/O from a higher priority class be processed before I/O from a lower priority class.

The system 200 generally applies four techniques (can be more or less) to achieve the goals outlined above. For example, a two-level queuing mechanism can be provided that holds different types of requests in different request queues. The class-specific requests queues 230 perform class-level scheduling for different request classes. In one implementation, eight class-specific queues can be provided, for example. Periodic requests are held in the periodic queue 220 and are generally maintained in EDF order, whereas aperiodic requests are generally maintained in FIFO order. These orderings mitigate periodic requests from backing up behind a large burst of aperiodic requests and also allows the scheduling of high priority requests before low priority requests.

The sweep queue 240 is employed to queue requests that will be scheduled to the physical disk 250. Requests from the class-specific queues are moved to the sweep queue as it empties. The elements in the sweep queue are ordered in logical-block-address (LBA) ordering (other orderings possible), wherein the sweep queue performs a C-LOOK algorithm (or other similar type) when scheduling requests to the drive 250. Additionally, the system 200 fixes the size of the sweep queue 240, in order calculate a priori the length of time required to schedule the entire sweep queue. Moreover, the system 200 can reserve entries in the sweep queue 240 to facilitate availability of I/O bandwidth when necessary.

Figure 3:
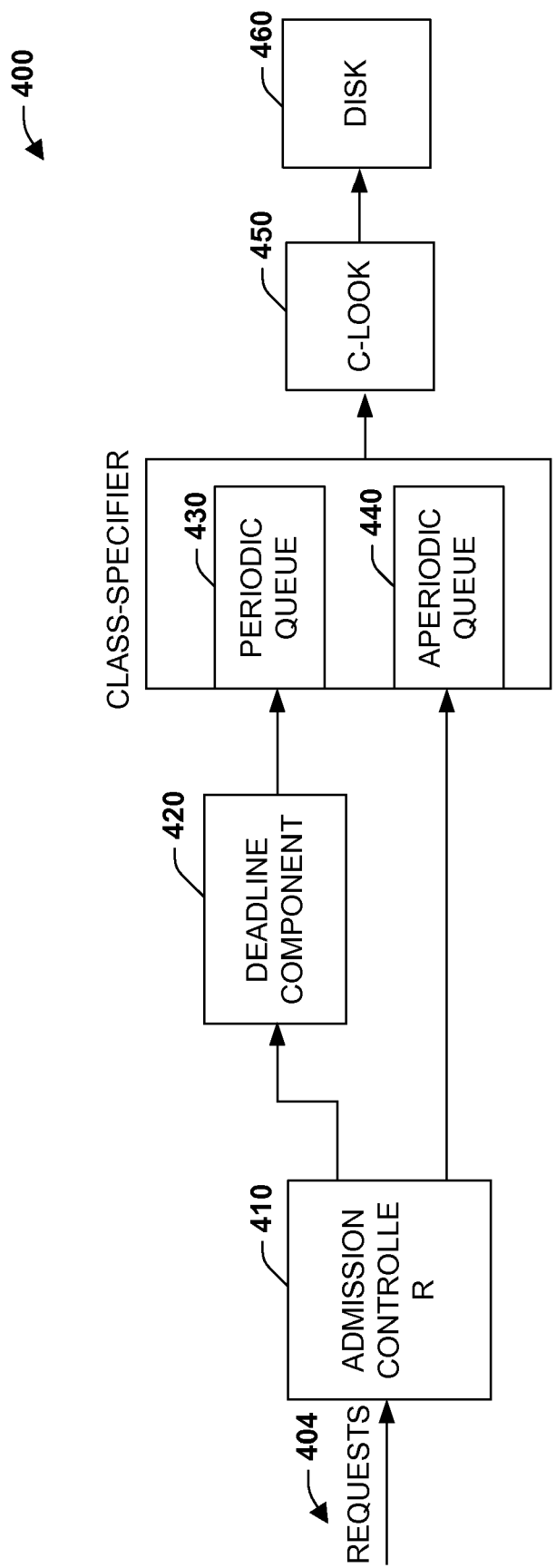
FIG. 3 is a schematic block diagram illustrating a disk-scheduling system in accordance with an aspect of the present invention.

FIG. 3 illustrates a system 400 that can be employed to perform an implementation of the components and process described above. One or more requests 404 for I/O disk access are received by an admission controller 410, wherein the request is generally received from a component or application executable on a computer system. If the request is a periodic request, a deadline component 420 associated with the admission controller 410 assigns a deadline or timeframe in which the request is to be completed. Other type requests such as non-periodic requests are passed from the admission controller 410 to an aperiodic queue 430 associated with class-specifier component. The periodic requests that were tagged with deadline specifications are processed within a periodic queue 440 within the class specifier-component. The class-specifier sorts requests based upon a desired policy associated with a selected class of requests. As noted above, the periodic queue 440 can be arranged according to an EDF ordering, whereas the aperiodic queue 430 can be arranged according to a FIFO ordering. When a current sweep round has completed, a sweep queue (not shown) is filled from the queues 430 and 440. The sweep queue is then scheduled to a disk 450 (or disks) in C-Look order via a C-Look component 460.

Figure 4:
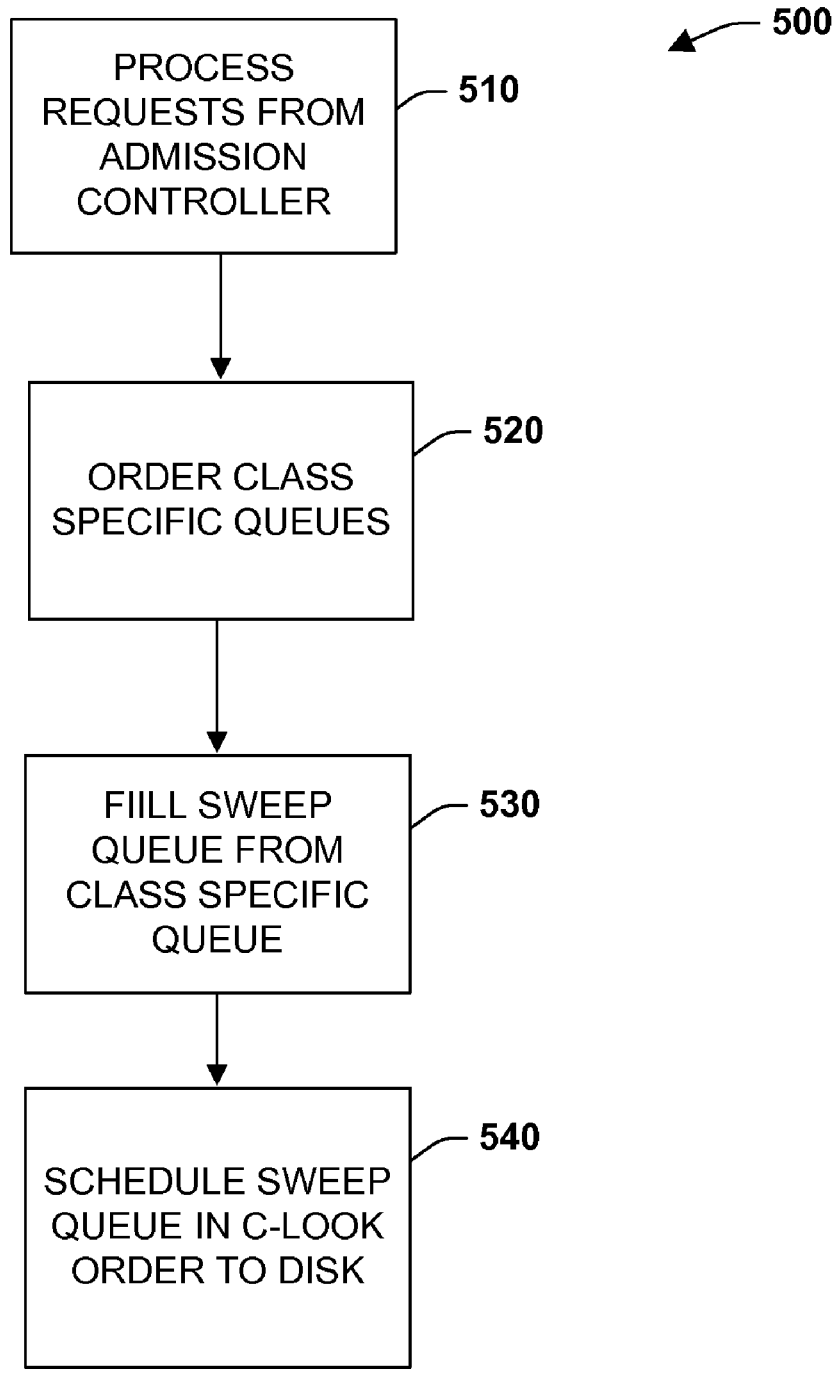
FIG. 4 is a flow diagram illustrating a disk scheduling process in accordance with an aspect of the present invention.
Figure 5:
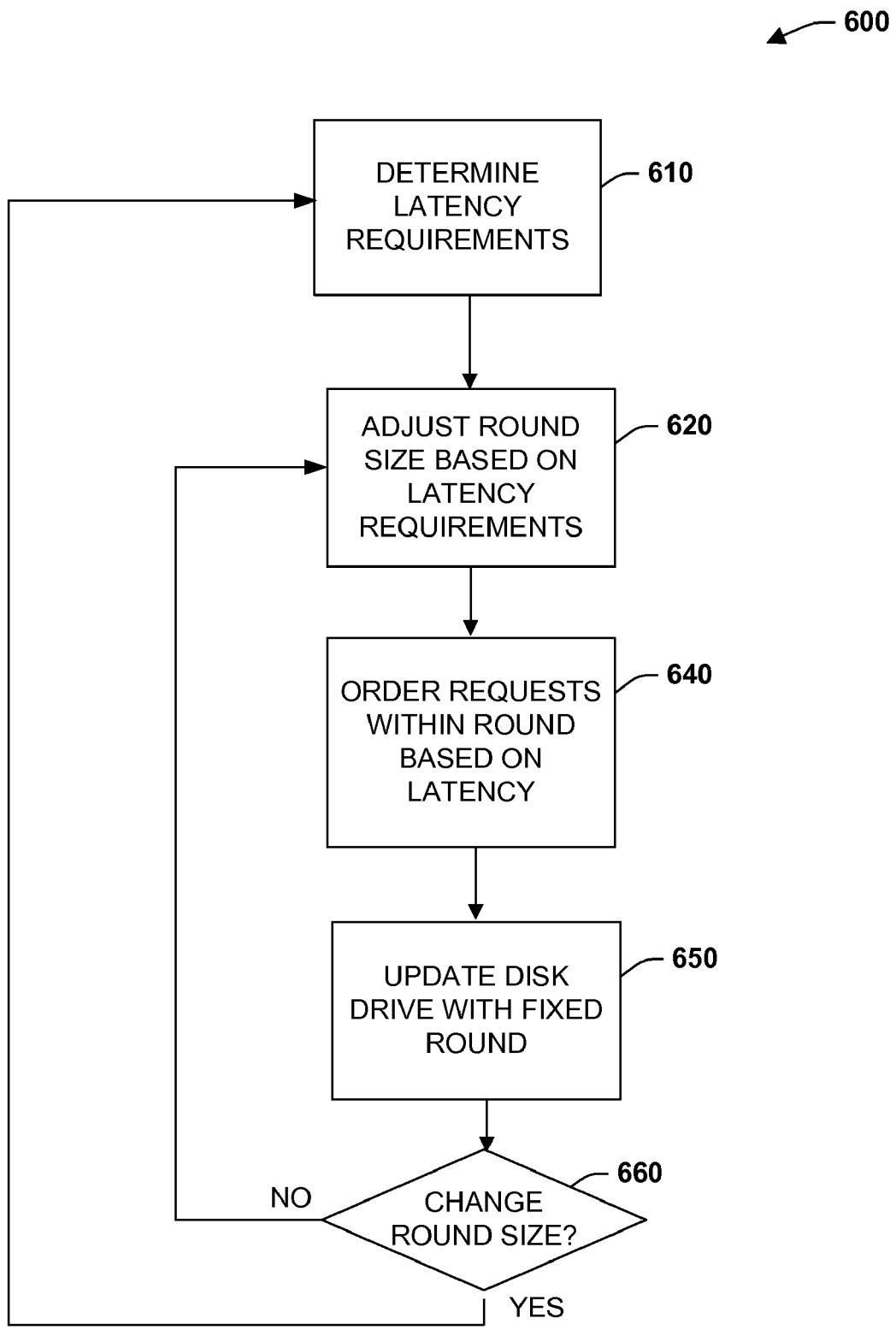
FIG. 5 is a flow diagram illustrating a disk scheduling process in accordance with an aspect of the present invention.

FIGS. 4 and 5 illustrate disk scheduling processes in accordance with an aspect of the present invention. While, for purposes of simplicity of explanation, the methodologies are shown and described as a series of acts, it is to be understood and appreciated that the present invention is not limited by the order of acts, as some acts may, in accordance with the present invention, occur in different orders or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 4 depicts a process 500 for one particular implementation of a disk scheduling process in accordance with the present invention. Proceeding to 510, an admission controller receives/processes a request (or requests) from upper levels of a computer system. If the request is a periodic request, the admission controller provides a deadline for the I/O request; otherwise the request is passed from the admission controller to a class-specific queue unmodified. At 520, requests from the admission controller are placed on the proper class-specific queue. The class-specific queue sorts requests based upon a desired or suitable policy for that class of requests, wherein periodic requests are sorted in an EDF ordering and aperiodic requests are sorted in a FIFO ordering. At 530, When a current sweep round completes, a sweep queue is filled from requests from the class-specific queues. At 540, the sweep queue is scheduled to the disk in a C-LOOK order, for example. The following is example Pseudo-code for an algorithm in accordance with the present invention that can be employed with the systems and method described herein.

Example while periodic-queue≠Ø and periodic-slots≠0 and
DEADLINE (periodic-queue)<ROUND_TIME do
INSERT_LBA_ORDER (sweep-queue, REMOVE_EDF_ORDER (periodic-queue))
periodic-slots=periodic-slots−1
end
for priority=High downto Idle do
while priority-list [priority].slots≠0
INSERT_LBA_ORDER (sweep-queue,
REMOVE_FIFO_ORDER (priority-queue [priority]))
priority-list [priority].slots=priority-list [priority].slots−1
end
end
while sweep-queue≠Ø do
SCHEDULE (REMOVE_MINMUM_LBA (sweep-queue))
end It is noted that that the above algorithm has a well-defined upper bound on the latency to complete a specified number of requests. For n requests, n being an integer, the upper-bound on latency is as follows:

$$\text{service}(n) = n\left(\text{time\_seek}\left(\frac{\text{Cylinders}}{N}\right) + time_{transfer} + time_{rotation} + time_{controller}\right) + time_{sw}$$

Therefore, in the above algorithm, the maximum I/O service time is parameterized by the sweep-depth variable (n). Given sweep-depth and the parameters for a specific disk drive, one can compute the worst-case latency values for a given sweep-depth.

In describing some of the components that can be employed in accordance with the present invention, it is noted that C-LOOK by itself generally treats all requests equally, without providing any latency guarantees. However, it does provide optimal scheduling of the disk in the sense that disk throughput is maximized. EDF algorithms can process requests with earliest deadlines first, but may incur large seek delays. EDF scan is generally a tradeoff between the two. Thus, it is difficult to give guarantees in an EDF scan, as respective I/O's may be sent with a deadline of zero degenerating into the scan. The present invention and associated algorithms operate at a tradeoff of providing worst case latency guarantees, offering tighter admission controls, providing bounded latency guarantees and with locally optimal scheduling of disk and priority schemes for regular I/O.

FIG. 5 illustrates a process 600 for an alternative disk scheduling methodology in accordance with an aspect of the present invention. Proceeding to 610, latency requirements for I/O requests are determined (e.g., what are the worst case scheduling times for an application to work properly). At 620, round size is adjusted based on the latency requirement determined at 610. At 640, requests are ordered within a round based upon the determined latency requirements. At 650, a disk is updated according to a round having a fixed size based upon the determination at 610 and 620. At 660, a determination is made as to whether to alter or change the size of the round (e.g., dynamic consideration based on changed system circumstances). If not, the process proceeds back to 620 to process a subsequent round of I/O requests. If the round size is to be adjusted at 660, the process proceeds back to 610, wherein latency requirements are determined and the round size is then readjusted at 620.

Figure 6:
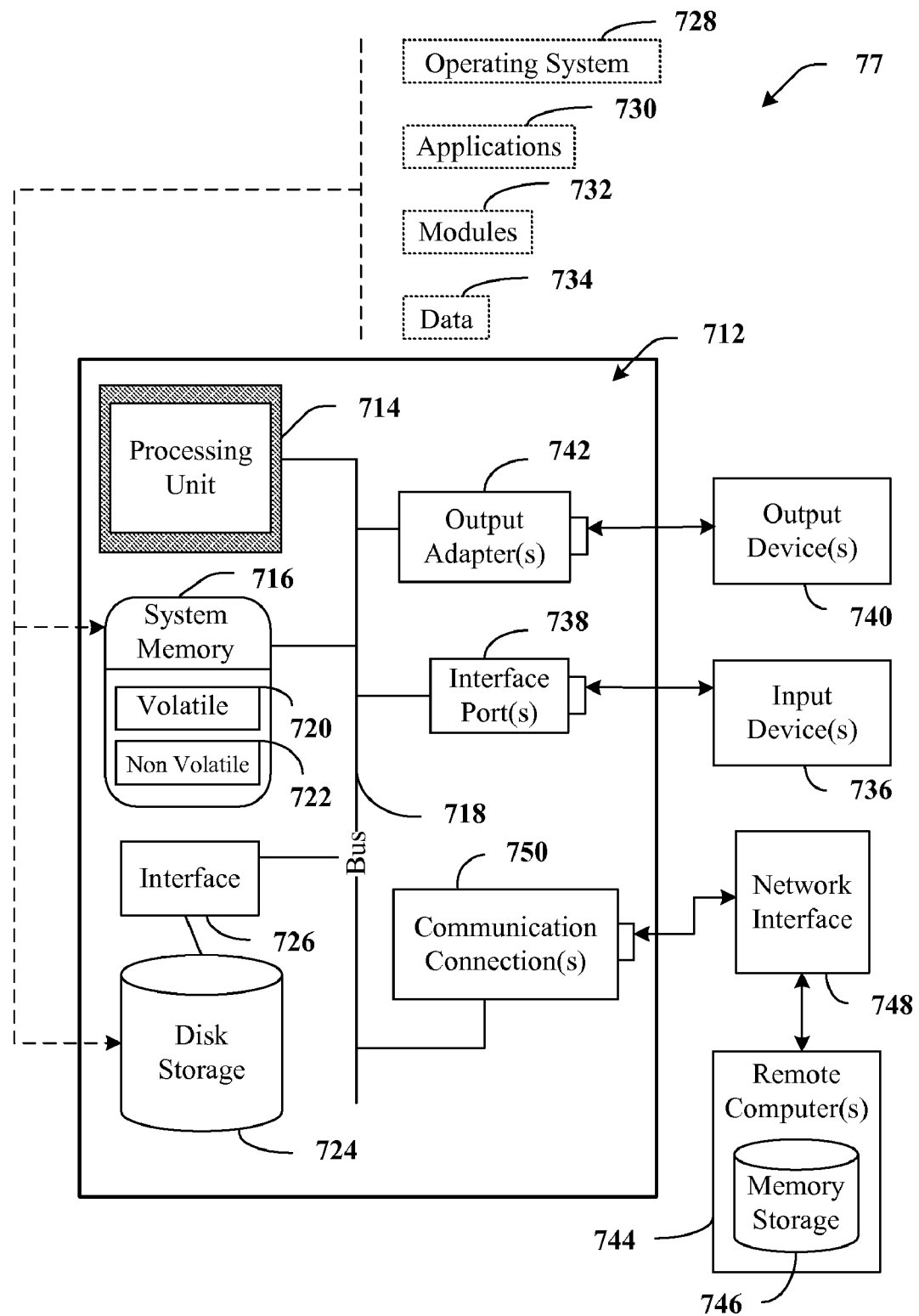
FIG. 6 is a schematic block diagram illustrating a suitable operating environment in accordance with an aspect of the present invention.

With reference to FIG. 6, an exemplary environment 710 for implementing various aspects of the invention includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/non-removable, volatile/non-volatile computer storage media. FIG. 6 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 6 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the present invention can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers, among other output devices 740, that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

Figure 7:
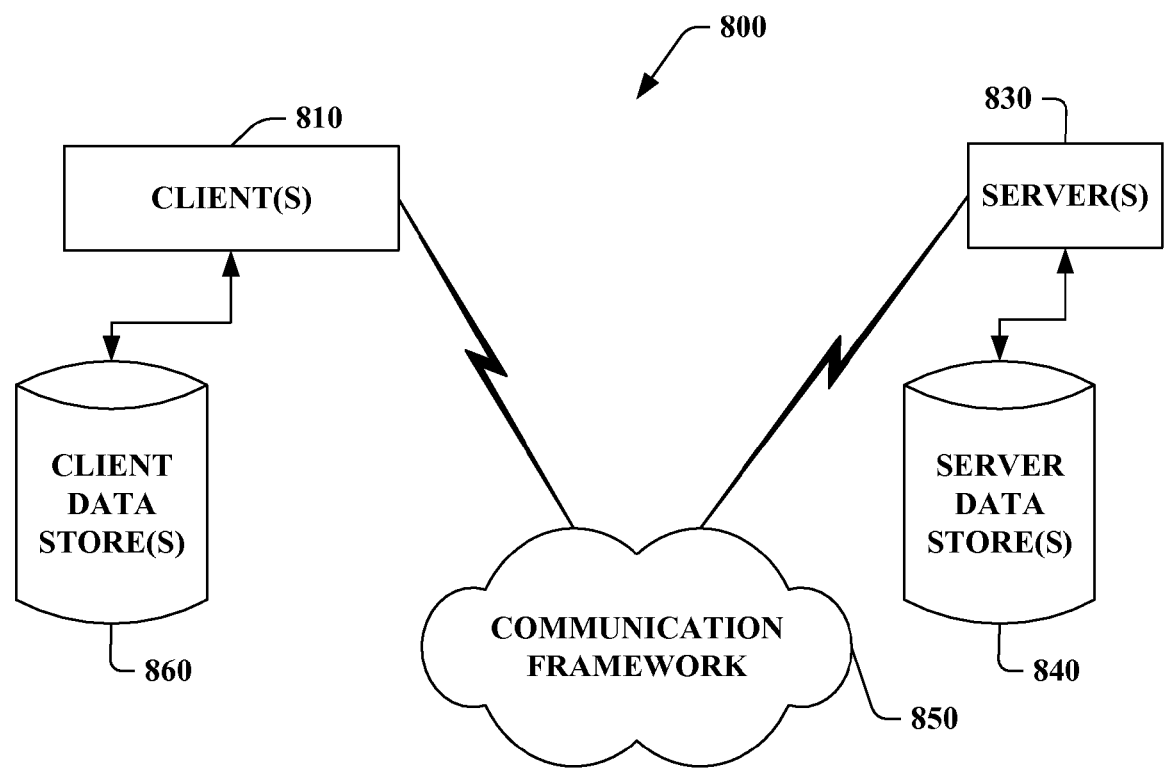
FIG. 7 is a schematic block diagram of a sample-computing environment with which the present invention can interact.

FIG. 7 is a schematic block diagram of a sample-computing environment 800 with which the present invention can interact. The system 800 includes one or more client(s) 810. The client(s) 810 can be hardware and/or software (e.g., threads, processes, computing devices). The system 800 also includes one or more server(s) 830. The server(s) 830 can also be hardware and/or software (e.g., threads, processes, computing devices). The servers 830 can house threads to perform transformations by employing the present invention, for example. One possible communication between a client 810 and a server 830 may be in the form of a data packet adapted to be transmitted between two or more computer processes. The system 800 includes a communication framework 850 that can be employed to facilitate communications between the client(s) 810 and the server(s) 830. The client(s) 810 are operably connected to one or more client data store(s) 860 that can be employed to store information local to the client(s) 810. Similarly, the server(s) 830 are operably connected to one or more server data store(s) 840 that can be employed to store information local to the servers 830.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A disk scheduling system, comprising:
   a plurality of queues, each of the plurality of queues being in a class, and the plurality of queues comprising queues in a plurality of different classes;
   a processor;
   components executable on the processor, the components comprising:
      a categorizer component that automatically directs input/output requests, each input/output request being directed into a selected queue of the plurality of queues, the selected queue having a class selected based on a priority of the input/output request;
      a scheduler component that transfers input/output requests from the plurality of queues to a storage medium in a plurality of rounds, the transferred rounds of input/output requests having a size, the size being in terms of number of requests per round; and
      a latency determination component that determines a latency requirement for the input/output requests,
   wherein the scheduler component computes the size of the transferred rounds, in terms of the number of requests per round, based at least in part upon the latency requirement for the input/output requests.

2. The system of claim 1, the classes of queues comprising at least one of a periodic class and an a periodic class.

3. The system of claim 2, further comprising a deadline component that assigns a deadline or timeframe to a request if the request is in a periodic class.

4. The system of claim 1, further comprising a class-specifier component that sorts the input/output requests based upon a desired policy associated with a selected class of requests.

5. The system of claim 2, input/output requests held in the periodic class queue are maintained in a Earliest-Deadline-First (EDF) order.

6. The system of claim 2, input/output requests held in the aperiodic class queue are maintained in a First-In-First-Out (FIFO) order.

7. The system of claim 1, further comprising an admission control component that checks performance parameters of a periodic input/output request against system resources and aborts the periodic input/output request before the scheduler component transfers data to/from the queue to the storage medium if the periodic input/output request exceeds system capabilities.

8. The system of claim 2, requests from the class-specific queues are moved to a sweep queue, the sweep queue is scheduled to the storage medium in C-Look order.

9. The system of claim 8, requests in the sweep queue can be reserved to facilitate availability of input/output bandwidth when necessary.

10. The system of claim 1, the storage medium includes at least one of a hard disk, floppy disk, memory stick, compact disk, and a memory that is scheduled to be accessed from a computer.

11. A method to schedule requests to a storage medium, comprising:
    determining a class for a request;
    moving the request to one of at least one class-specified queue;
    determining a latency requirement associated with a set of requests that includes the request;
    selecting a fixed size for a sweep Queue, in terms of a number of requests, based at least in part on the latency requirement;
    loading the sweep queue with a number of requests equaling the fixed size from the at least one class-specified queue, the sweep queue having the fixed size before updating the storage medium; and
    updating the storage medium in one or more rounds of data, the requests in each round ordered based upon the latency requirement and a desired throughput for the set of requests.

12. The method of claim 11, determining the class of a request comprises determining if the request is at least one of a periodic class or an aperiodic class.

13. The method of claim 12, further comprising assigning a deadline or timeframe to the request if the request is determined to be of a periodic class.

14. The method of claim 11, further comprising sorting requests based upon a desired policy associated with the determined class.

15. The method of claim 14, the sorting includes sorting requests based upon the desired poi icy associated with the determined class that includes at least one of critical, high, interactive, normal, background, low or idle.

16. A computer-readable storage medium comprising a plurality of computer-executable software components, the plurality of computer-executable software components comprising:
    a categorizer component that automatically directs input/output requests, each input/output request being directed into a selected queue of a plurality of queues, each of the plurality of queues being in a class, the classes including classes of periodic and aperiodic queues, the selected queue having a class selected based on a priority of the input/output request;

a scheduler component that transfers input/output requests from the class-specific queues to a sweep queue ordered in logical-block-address ordering, the sweep queue is scheduled to a storage medium in C-Look order in a plurality of rounds of input/output requests, the transferred rounds have a predetermined number of requests per round, the predetermined number of requests determined based at least in part upon a latency requirement, the latency requirement relates to a worst case scheduling time for one of the input/output requests; and an admission control component that checks performance parameters of a periodic input/output request against system resources and aborts the periodic input/output request before the scheduler component transfers the data to/from the sweep queue to the storage medium if the periodic input/output request exceeds system capabilities.

17. The computer-readable storage medium of claim 16, wherein the categorizer component directs multimedia input/output requests to one or more periodic queues among the class-specific queues, the multimedia input/output requests being input/output requests associated with a multimedia type application.

18. The system of claim 1, wherein the latency determination component is further configured to update the size of the transferred rounds based on a change in the latency requirement.

19. The system of claim 1, wherein the latency determination component determines the latency requirement based on a worst case scheduling time for one of the input/output requests.

20. The method of claim 11, further comprising:
    determining a second latency requirement associated with a second set of requests; and
    updating the fixed size based in part upon the second latency requirement.

* * * * *